(12) United States Patent
Zhang

(10) Patent No.: US 12,289,811 B2
(45) Date of Patent: Apr. 29, 2025

(54) CONTINUOUS SWITCHING MACHINE WITHOUT OVERSHOOT CIRCUIT

(71) Applicant: Guangdong Done Power Technology, Zhongshan (CN)

(72) Inventor: Hongsheng Zhang, Shantou (CN)

(73) Assignee: Guangdong Done Power Technology, Zhongshan (CN)

( * ) Notice: Subject to any disclaimer, the term of this patent is extended or adjusted under 35 U.S.C. 154(b) by 32 days.

(21) Appl. No.: 18/464,557

(22) Filed: Sep. 11, 2023

(65) Prior Publication Data

US 2024/0172343 A1 May 23, 2024

(30) Foreign Application Priority Data

Nov. 21, 2022 (CN) .......................... 202211455103.8

(51) Int. Cl.
*H05B 45/32* (2020.01)
*H05B 45/3725* (2020.01)

(52) U.S. Cl.
CPC ......... *H05B 45/32* (2020.01); *H05B 45/3725* (2020.01)

(58) Field of Classification Search
CPC combination set(s) only.
See application file for complete search history.

(56) References Cited

U.S. PATENT DOCUMENTS

| 9,750,094 | B1 * | 8/2017 | Winton | H05B 45/3578 |
| 2014/0333228 | A1 | 11/2014 | Angeles et al. | |
| 2019/0027918 | A1 * | 1/2019 | Yang | H02H 3/08 |

FOREIGN PATENT DOCUMENTS

| CN | 205693558 U | 11/2016 |
| CN | 207304403 U | 5/2018 |
| CN | 217608014 U | 10/2022 |
| JP | 2004226185 A | 8/2004 |
| WO | 2018027502 A1 | 2/2018 |

* cited by examiner

*Primary Examiner* — Renan Luque

(57) ABSTRACT

A continuous switching machine without overshoot circuit, including an input terminal; a voltage dividing circuit; a voltage reference chip U5, the voltage reference chip U5 is connected to an optocoupler U3, and the optocoupler U3 also inputs a first voltage, and the optocoupler U3 is grounded through a resistor R3, It is also connected to the gate of MOS transistor Q1, and the second voltage is input through resistor R2; the second voltage is connected to optocoupler U2 through resistor R4, which is also connected to the output terminal of operational amplifier U4, and one end of optocoupler U2 Grounded, one end is connected to the driver chip U1 through the resistor R1; it also includes the third voltage, the third voltage is grounded through the resistor R8 and the charging capacitor C2, and is also connected to the positive phase terminal of the operational amplifier U4, and the charging capacitor C2 is also passed through the MOS transistor Q1 Grounding; the lamp terminal is grounded through the sampling resistor R_CS, and also connected to the negative phase terminal of the operational amplifier U4 through the resistor R12.

5 Claims, 1 Drawing Sheet

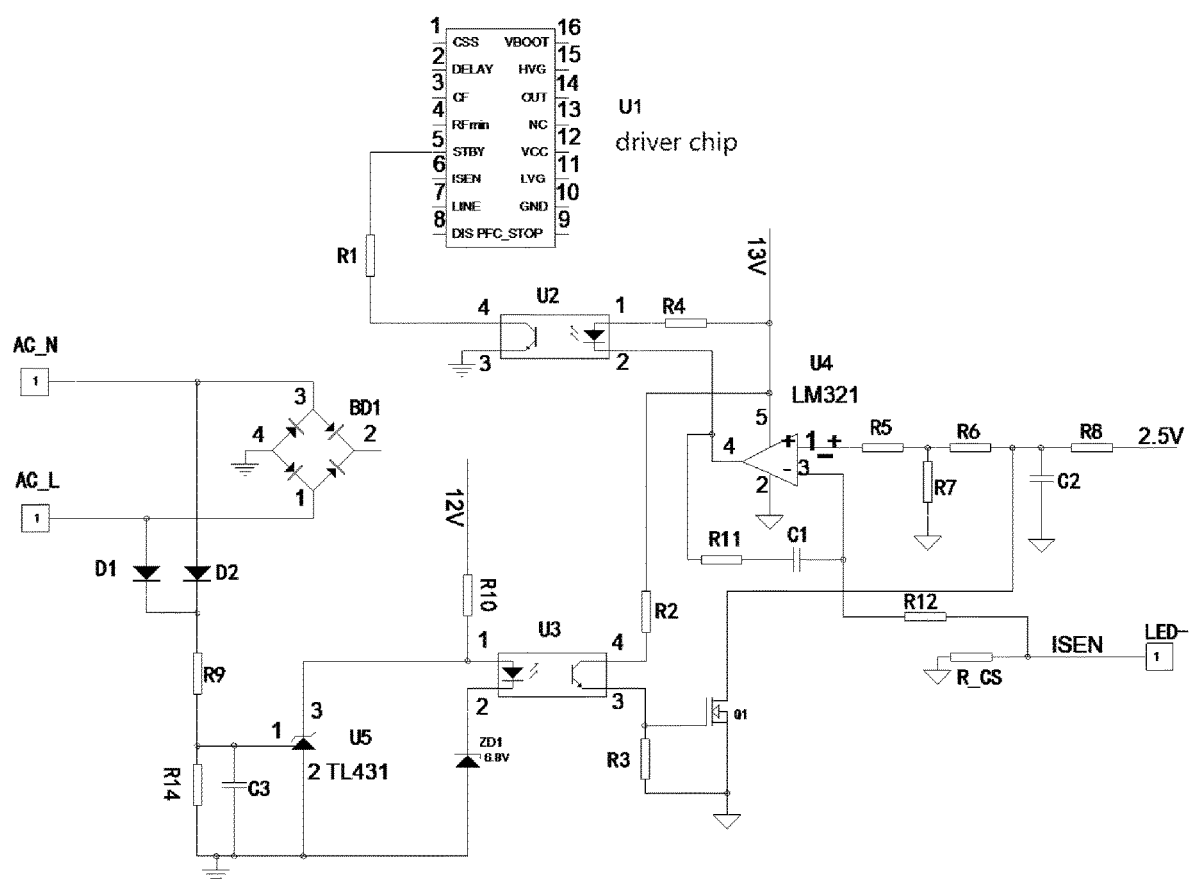

CONTINUOUS SWITCHING MACHINE WITHOUT OVERSHOOT CIRCUIT

TECHNICAL FIELD

The invention relates to the field of LEDs, in particular to a continuous on/off circuit without overshoot.

BACKGROUND TECHNIQUE

LED lighting has the advantages of energy saving, environmental protection and long life. The corresponding LED power supply is also constantly developing and changing. Since the LED mainly works through constant current control, if its working current exceeds its maximum current limit, it is easy to damage the LED and affect the life of the LED, and usually the LED power supply has a large output current overshoot when it is switched on and off continuously, and some current overshoots exceed 50%, which is easy to damage the LED and affect the life of the LED

CONTENTS OF THE INVENTION

In order to solve the above problems, this technical solution provides a continuous power on and off without overshoot circuit. With the circuit of the present invention, the power supply is soft-started during continuous power on and off, and there is no problem of current overshoot, so that the LED will not be damaged. The continuous power-on impulse current is also smaller, and there is less pollution to the power grid.

To achieve the above object, the technical solution is as follows:

A continuous on/off circuit without overshoot, comprising;

Input;

A voltage divider circuit, which is connected to the input end, and is provided with a voltage reference chip U5 on its output end, and the voltage reference chip U5 is connected to the light-emitting end of the optocoupler U3, and the light-emitting end of the optocoupler U3 is also Input the first voltage, the conduction terminal of the optocoupler U3 is grounded through the resistor R3, and is also connected to the gate of the MOS transistor Q1, and the other conduction terminal inputs the second voltage through the resistor R2, and the second voltage is also used To power the op amp U4;

The second voltage is connected to the light-emitting end of the optocoupler U2 through the resistor R4, and the other light-emitting end is connected to the output end of the op amp U4, the conduction end of the optocoupler U2 is grounded, and the other conduction The terminal is connected to the driver chip U1 through the resistor R1;

It also includes a third voltage, the third voltage is grounded through the resistor R8 and the charging capacitor C2, and is also connected to the positive phase terminal of the operational amplifier U4, and the charging capacitor C2 is also grounded through the MOS transistor Q1;

The lamp terminal is grounded through the sampling resistor R_CS, and also connected to the negative phase terminal of the operational amplifier U4 through the resistor R12.

In some embodiments, the output terminal of the operational amplifier U4 is connected to the negative phase terminal through the resistor R11 and the capacitor C1.

In some embodiments, it further includes a Zener diode ZD1 connected to the other conducting end of the optocoupler U3.

In some embodiments, a rectification module BD1 is also included, which is connected to the input end.

In some embodiments, the voltage divider circuit includes a diode D1 and a diode D2 connected to the input terminal, and a resistor R9 is provided at the output terminal, and the resistor R9 is connected to the voltage reference chip U5, and is also connected to the voltage reference chip U5 through a resistor R14 And the capacitor C3 is grounded.

The beneficial effects of this application are:

Using the above invention patents, the product enters soft start when it is switched on and off continuously, and there will be no current overshoot phenomenon, so that the LED will not be damaged, the impact current of continuous startup is also smaller, and there is less pollution to the power grid.

DESCRIPTION OF DRAWINGS

In order to illustrate the technical solutions in the embodiments of the present invention more clearly, the following will briefly introduce the drawings that need to be used in the description of the embodiments.

FIG. 1 is a schematic structural diagram of an embodiment of the present invention.

DETAILED WAYS

In order to make the technical problems, technical solutions and beneficial effects solved by the present invention clearer, the present invention will be further described in detail below in conjunction with the accompanying drawings and embodiments. It should be understood that the specific embodiments described here are only used to explain the present invention, not to limit the present invention.

Please refer to FIG. 1, a continuous switching machine without overshoot circuit, including;

Input;

A voltage divider circuit, which is connected to the input end, and is provided with a voltage reference chip U5 on its output end, and the voltage reference chip U5 is connected to the light-emitting end of the optocoupler U3, and the light-emitting end of the optocoupler U3 is also Input the first voltage, the conduction terminal of the optocoupler U3 is grounded through the resistor R3, and is also connected to the gate of the MOS transistor Q1, and the other conduction terminal inputs the second voltage through the resistor R2, and the second voltage is also used To power the op amp U4;

The second voltage is connected to the light-emitting end of the optocoupler U2 through the resistor R4, and the other light-emitting end is connected to the output end of the op amp U4, the conduction end of the optocoupler U2 is grounded, and the other conduction The terminal is connected to the driver chip U1 through the resistor R1;

It also includes a third voltage, the third voltage is grounded through the resistor R8 and the charging capacitor C2, and is also connected to the positive phase terminal of the operational amplifier U4, and the charging capacitor C2 is also grounded through the MOS transistor Q1;

The lamp terminal is grounded through the sampling resistor R_CS, and also connected to the negative phase terminal of the operational amplifier U4 through the resistor R12.

Please refer to FIG. 1, the voltage of the R_CS current detection resistor is connected to the negative terminal of the third pin of the U4 operational amplifier LM321 through R12, and the 2.5V voltage is connected to the first pin of the U4 operational amplifier LM321 through R8, C2, R6, R7, and R5. Pin 1 positive terminal, when the voltage of pin 3 of U4 is greater than the voltage of pin 1 of U4, the output voltage of pin 4 of U4 decreases, so that the optocoupler U2 is turned on, and the driver chip of U1 is controlled to reduce the output current, so that the output The current reaches a constant value. When starting up for the first time, the voltage at both ends of C2 rises slowly, that is, the current reference voltage at the positive end of the first pin of the U4 op amp LM321 is also slowly raised through R5, R6, and R7 resistors, so that the output The current also rises slowly to achieve soft start. The circuit of the present invention makes the voltage of pin 1 of TL431 of U5 rectified and divided by D1, D2, R9, R14, and C3 to be less than 2.5V quickly when the AC_L and AC_N input voltages are less than 50 VAC when the power is turned off, so that U5 is not turned on, so that the U3 optocoupler is turned on, and then the gate voltage of Q1 MOS tube is greater than the turn-on voltage, Q1 is turned on, and C2 is quickly discharged to close to 0V, so that the power supply is turned on again continuously and soft-started again, and the output The current will not overshoot, so that the LED will not be damaged, the continuous power-on impact current is also smaller, and there is less pollution to the power grid.

In some embodiments, the output terminal of the operational amplifier U4 is connected to the negative phase terminal through the resistor R11 and the capacitor C1.

In some embodiments, it further includes a Zener diode ZD1 connected to the other conducting end of the optocoupler U3.

In some embodiments, a rectification module BD1 is also included, which is connected to the input end.

In some embodiments, the voltage divider circuit includes a diode D1 and a diode D2 connected to the input terminal, and a resistor R9 is provided at the output terminal, and the resistor R9 is connected to the voltage reference chip U5, and is also connected to the voltage reference chip U5 through a resistor R14 And the capacitor C3 is grounded.

The above descriptions are only preferred embodiments of the present application, and are not intended to limit the implementation scope of the present application. If other principles and basic structures are the same or similar to this application, they are within the scope of protection of this application.

What is claimed is:

1. A continuous on/off circuit without overshoot, comprising;

an input end;

a voltage divider circuit, which is connected to the input end, and is provided with a voltage reference chip U5 on its output end, and the voltage reference chip U5 is connected to a light-emitting end of an optocoupler U3, and the light-emitting end of the optocoupler U3 is also input a first voltage, a conduction terminal of the optocoupler U3 is grounded through a resistor R3, and is also connected to a gate of a MOS transistor Q1, and an other conduction terminal inputs a second voltage through a resistor R2, and the second voltage is also configured to power an op amp U4;

the second voltage is connected to a light-emitting end of an optocoupler U2 through a resistor R4, and an other light-emitting end is connected to an output end of the op amp U4, a conduction end of the optocoupler U2 is grounded, and an other conduction end of the optocoupler U2 is connected to a driver chip U1 through a resistor R1;

the continuous on/off circuit further comprises a third voltage, the third voltage is grounded through a resistor R8 and a charging capacitor C2, and is also connected to a positive phase terminal of the op amp U4, and the charging capacitor C2 is also grounded through the MOS transistor Q1;

a lamp terminal is grounded through a sampling resistor R_CS, and also connected to a negative phase terminal of the op amp U4 through a resistor R12.

2. The continuous on/off circuit without overshoot according to claim 1, wherein the output end of the op amp U4 is connected to the negative phase terminal through a resistor R11 and a capacitor C1.

3. The continuous on/off circuit without overshoot according to claim 1, further comprising a Zener diode ZD1 connected to an other conduction terminal of the optocoupler U3.

4. The continuous on/off circuit without overshoot according to claim 1, further comprising a rectification module BD1 connected to the input end.

5. The continuous on/off circuit without overshoot according to claim 4, wherein the voltage divider circuit includes a diode D1 and a diode D2 connected to the input end, and a resistor R9 is provided at its output end, the resistor R9 is connected to the voltage reference chip U5, and is also grounded through a resistor R14 and a capacitor C3.

* * * * *